(12) United States Patent
Wilson et al.

(10) Patent No.: US 11,674,474 B2
(45) Date of Patent: Jun. 13, 2023

(54) THRUST REVERSER CASCADE AND METHOD OF MANUFACTURE

(71) Applicant: SHORT BROTHERS PLC, Northern Ireland (GB)

(72) Inventors: Robert Samuel Wilson, Belfast (GB); Oran Walsh, Donaghadee (GB)

(73) Assignee: SHORT BROTHERS PLC, Belfast (GB)

( * ) Notice: Subject to any disclaimer, the term of this patent is extended or adjusted under 35 U.S.C. 154(b) by 0 days.

(21) Appl. No.: 17/690,540

(22) Filed: Mar. 9, 2022

(65) Prior Publication Data

US 2022/0195961 A1 Jun. 23, 2022

Related U.S. Application Data

(62) Division of application No. 16/441,859, filed on Jun. 14, 2019, now abandoned.

(30) Foreign Application Priority Data

Jun. 19, 2018 (GB) .................................. 1810073.5

(51) Int. Cl.
*F02K 1/62* (2006.01)
*F02K 1/70* (2006.01)
(Continued)

(52) U.S. Cl.
CPC .............. *F02K 1/625* (2013.01); *B29C 69/02* (2013.01); *F02K 1/70* (2013.01); *B29K 2071/00* (2013.01);
(Continued)

(58) Field of Classification Search
CPC ... F02K 1/625; F02K 1/70; F02K 1/72; F02K 1/80; B29K 2071/00; B29K 2105/0845;
(Continued)

(56) References Cited

U.S. PATENT DOCUMENTS 4,722,821 A * 2/1988 Vermilye .................. F02K 1/72
264/328.8
4,852,805 A * 8/1989 Vermilye .......... B29C 45/14631
264/46.7
(Continued)

FOREIGN PATENT DOCUMENTS

| EP | 0219889 A2 | 5/1986 |
| EP | 1515035 A2 | 9/2004 |
| EP | 3141375 A1 | 7/2020 |

OTHER PUBLICATIONS

European Search Report dated Nov. 14, 2019, for European Patent Application No. 19180998.7.
(Continued)

*Primary Examiner* — Andrew H Nguyen
(74) *Attorney, Agent, or Firm* — Hovey Williams LLP

(57) ABSTRACT

A thrust reverser cascade of an aircraft engine comprises a frame and a vane overmolded onto the frame. The frame and the vane each comprise reinforcement fibers in a thermoplastic matrix. A method is disclosed for manufacturing the thrust reverser cascade or another part comprising an aerodynamic surface configured to interact with a flow of fluid. The method comprises providing a first portion of the part and overmolding a second portion of the part onto the first portion where the second portion includes the aerodynamic surface.

20 Claims, 15 Drawing Sheets

(51) Int. Cl.
*B29C 69/02* (2006.01)
*B29L 31/30* (2006.01)
*B29K 105/08* (2006.01)
*B29K 105/14* (2006.01)
*B29K 71/00* (2006.01)

(52) U.S. Cl.
CPC .. *B29K 2105/0845* (2013.01); *B29K 2105/14* (2013.01); *B29L 2031/3076* (2013.01)

(58) Field of Classification Search
CPC ......... B29K 2105/14; B29L 2032/3076; F05D 2240/129; B29C 69/02
See application file for complete search history.

(56) References Cited

U.S. PATENT DOCUMENTS

| | | | |
|---|---|---|---|
| 5,624,618 A | 4/1997 | Forman et al. | |
| 9,527,238 B2 | 12/2016 | Kruckenberg | |
| 9,587,582 B1 | 3/2017 | Schaefer et al. | |
| 9,803,587 B1 | 10/2017 | Schaefer et al. | |
| 9,835,112 B2 | 12/2017 | Calder et al. | |
| 9,895,840 B2 | 2/2018 | Bartel et al. | |
| 10,830,176 B2 | 11/2020 | Soria et al. | |
| 2004/0088858 A1* | 5/2004 | Holme | F02K 1/54 29/889.22 |
| 2014/0341759 A1 | 11/2014 | Calico et al. | |
| 2018/0340492 A1* | 11/2018 | Harpal | F02K 1/72 |
| 2019/0257268 A1* | 8/2019 | Roach | F02K 1/64 |

OTHER PUBLICATIONS

UK Search Report dated Jul. 27, 2018, for UK Patent Application No. GB1810073.5.
Gardiner. "Overmolding expands PEEK'S range is composites," Jul. 1, 2015, <https://www.compositesworld.com/articles/overmolding-expands-peeks-range-in-composites>.

* cited by examiner

THRUST REVERSER CASCADE AND METHOD OF MANUFACTURE

RELATED APPLICATIONS

This divisional patent application claims priority benefit to earlier-filed U.S. patent application Ser. No. 16/441,859, titled "THRUST REVERSER CASCADE AND METHOD OF MANUFACTURE", filed Jun. 14, 2019. The earlier-filed patent application is hereby incorporated by reference, in its entirety, into the current patent application.

TECHNICAL FIELD

The disclosure relates generally to aircraft, and more particularly to thrust reverser cascades of aircraft engines and associated manufacturing methods.

BACKGROUND

Aircraft engines are often equipped with thrust reversers that increase drag and can reduce the speed of the aircraft during landing. For a cascade-type thrust reverser, a transcowl on the nacelle of the aircraft engine translates rearwardly to expose a cascade comprising a plurality of vanes. A blocker door causes a bypass airflow through the engine to be directed through the thrust reverse cascade where the vanes redirect the airflow forwardly to produce reverse thrust.

Some thrust reverser cascades are fabricated using composite materials which require many processing steps and specialized equipment. The fabrication of composite thrust reverser cascades can be time consuming, labor intensive and expensive. Improvement is desirable.

SUMMARY

In one aspect, the disclosure describes a method of manufacturing a thrust reverser cascade of an aircraft engine using overmolding. The method comprises:
  providing a first portion of the thrust reverser cascade; and
  overmolding a second portion of the thrust reverser cascade onto the first portion, the second portion including one or more vanes of the thrust reverser cascade.

The first portion may include one or more outer frame members cooperatively defining at least part of a periphery of the thrust reverser cascade. The first portion may include a rib extending between two of the one or more outer frame members.

The first portion may include: outer frame members cooperatively defining at least part of a periphery of the thrust reverser cascade; two ribs extending between two of the outer frame members; and one or more braces extending between the two ribs. The method may comprise overmolding the one or more vanes directly onto respective ones of the one or more braces.

The first portion and the second portion may each comprise reinforcement fibers in a thermoplastic matrix. The reinforcement fibers of the first portion may be longer than the reinforcement fibers of the second portion. The second portion may comprise about a 30% volume fraction of reinforcement fibers. A majority of the reinforcement fibers of the first portion may be generally unidirectional. A majority of the reinforcement fibers of the first portion may be generally parallel. A majority of the reinforcement fibers of the first portion may be woven. A majority of the reinforcement fibers in the second portion may be variably oriented. The reinforcement fibers in the second portion may be between 0.25 inch (6.4 mm) and 0.5 inch (12.7 mm) in length.

The second portion may comprise one or more ribs of the thrust reverser cascade.

Providing the first portion may comprise thermoforming the first portion.

Providing the first portion may comprise thermoforming a plurality of outer frame members cooperatively defining at least part of a periphery of the thrust reverser cascade. The second portion may include one or more ribs of the thrust reverser cascade. The method may comprise bonding the plurality of outer frame members together before overmolding the second portion.

Providing the first portion may comprise: thermoforming a plurality of outer frame members cooperatively defining at least part of a periphery of the thrust reverser cascade; and thermoforming one or more ribs of the thrust reverser cascade. The method may comprise bonding the plurality of outer frame members together and bonding the one or more ribs to the outer frame members before overmolding the one or more second components.

Providing the first portion may comprise thermoforming one or more braces of the thrust reverser cascade. The method may comprise: bonding the one or more braces to the one or more ribs; and overmolding the one or more vanes onto respective ones of the one or more braces.

Providing the first portion may comprise thermoforming one or more braces of the thrust reverser cascade. The method may comprise: interlocking the one or more braces with the one or more ribs; and overmolding the one or more vanes onto respective ones of the one or more braces.

Providing the first portion may comprise thermoforming a single-piece outer frame defining a periphery of the thrust reverser cascade. The second portion may include one or more ribs of the thrust reverser cascade. The method may comprise thermoforming one or more ribs of the thrust reverser cascade. The method may comprise bonding the one or more ribs to the single-piece outer frame before overmolding the second portion.

Embodiments can include combinations of the above features.

In another aspect, the disclosure describes a method of manufacturing a part comprising an aerodynamic surface for interacting with a flow of fluid. The method comprises:
  thermoforming a first portion of the part; and
  overmolding a second portion of the part onto the first portion, the second portion including the aerodynamic surface.

The first portion and the second portion may each comprise reinforcement fibers in a thermoplastic matrix. The reinforcement fibers of the first portion may be longer than the reinforcement fibers of the second portion. The second portion may comprise about a 30% volume fraction of reinforcement fibers. A majority of the reinforcement fibers of the first portion may be generally unidirectional. A majority of the reinforcement fibers of the first portion may be generally parallel. A majority of the reinforcement fibers of the first portion may be woven. A majority of the reinforcement fibers in the second portion may be variably oriented. The reinforcement fibers in the second portion may be between 0.25 inch (6.4 mm) and 0.5 inch (12.7 mm) in length.

The first portion may comprise a plurality of first components and the method may comprise bonding the plurality of first components together before overmolding the second portion.

Embodiments can include combinations of the above features.

In a further aspect, the disclosure describes a thrust reverser cascade of an aircraft engine. The thrust reverser cascade comprises:

a first portion; and a second portion overmolded onto the first portion, the second portion comprising an aerodynamic vane.

The first portion may comprise one or more thermoformed outer frame members cooperatively defining at least part of a periphery of the thrust reverser cascade. The first portion comprises a thermoformed rib connected to the one or more outer frame members.

The first portion and the second portion may each comprise reinforcement fibers in a thermoplastic matrix. The reinforcement fibers of the first portion may be longer than the reinforcement fibers of the second portion. The second portion may comprise about a 30% volume fraction of reinforcement fibers. A majority of the reinforcement fibers of the first portion may be generally unidirectional. A majority of the reinforcement fibers of the first portion may be generally parallel. A majority of the reinforcement fibers of the first portion may be woven. A majority of the reinforcement fibers in the second portion may be variably oriented. The reinforcement fibers in the second portion may be between 0.25 inch (6.4 mm) and 0.5 inch (12.7 mm) in length.

In some embodiments, the first portion may comprise a thermoformed brace defining a structural reinforcement of the aerodynamic vane and the reinforcement fibers of the brace may be longer than the reinforcement fibers of the aerodynamic vane. The brace may define an inner core of the aerodynamic vane.

Embodiments can include combinations of the above features.

In a further aspect, the disclosure describes a thrust reverser of an aircraft engine comprising a thrust reverser cascade as disclosed herein.

In a further aspect, the disclosure describes a part for interacting with a flow of fluid. The part comprises:

a thermoformed first portion; and a second portion overmolded onto the first portion, the second portion comprising an aerodynamic surface for interacting with the flow of fluid.

The thermoformed first portion may comprise one or more thermoformed members bonded together.

The first portion and the second portion may each comprise reinforcement fibers in a thermoplastic matrix. The reinforcement fibers of the first portion may be longer than the reinforcement fibers of the second portion. The second portion may comprise about a 30% volume fraction of reinforcement fibers. A majority of the reinforcement fibers of the first portion may be generally unidirectional. A majority of the reinforcement fibers of the first portion may be generally parallel. A majority of the reinforcement fibers of the first portion may be woven. A majority of the reinforcement fibers in the second portion may be variably oriented. The reinforcement fibers in the second portion may be between 0.25 inch (6.4 mm) and 0.5 inch (12.7 mm) in length.

In some embodiments, the first portion may comprise a thermoformed brace defining a structural reinforcement of the aerodynamic surface and the reinforcement fibers of the brace may be longer than the reinforcement fibers of the second portion.

In another aspect, the disclosure describes a method of manufacturing a part comprising an aerodynamic surface for interacting with a flow of fluid, the method comprising:

thermoforming a first portion of the part; and overmolding a second portion of the part onto the first portion, the second portion including the aerodynamic surface.

The first portion and the second portion may each comprise reinforcement fibers in a thermoplastic matrix.

The reinforcement fibers of the first portion may be longer than the reinforcement fibers of the second portion.

The second portion may comprise about a 30% volume fraction of reinforcement fibers.

The majority of the reinforcement fibers of the first portion may be generally unidirectional.

The majority of the reinforcement fibers of the first portion may be generally parallel.

The majority of the reinforcement fibers of the first portion may be woven.

The majority of the reinforcement fibers in the second portion may be variably oriented.

The reinforcement fibers in the second portion may be between 0.25 inch (6.4 mm) and 0.5 inch (12.7 mm) in length.

The first portion may comprise a plurality of first components and the method comprises bonding the plurality of first components together before overmolding the second portion.

In another aspect, the disclosure describes a part for interacting with a flow of fluid, the part comprising:

a thermoformed first portion; and a second portion overmolded onto the first portion, the second portion comprising an aerodynamic surface for interacting with the flow of fluid.

The thermoformed first portion may comprise one or more thermoformed members bonded together.

The thermoformed first portion and the second portion may each comprise reinforcement fibers in a thermoplastic matrix.

The reinforcement fibers of the thermoformed first portion may be longer than the reinforcement fibers of the second portion.

The second portion may comprise about a 30% volume fraction of reinforcement fibers.

The thermoformed first portion and the second portion may each comprise reinforcement fibers;

the thermoformed first portion may comprise a thermoformed brace defining a structural reinforcement of the aerodynamic surface; and the reinforcement fibers of the brace may be longer than the reinforcement fibers of the second portion.

The majority of the reinforcement fibers of the first portion may generally unidirectional.

The majority of the reinforcement fibers of the first portion may be generally parallel.

The majority of the reinforcement fibers of the first portion may be woven.

The majority of the reinforcement fibers in the second portion may be variably oriented.

The reinforcement fibers in the second portion may be between 0.25 inch (6.4 mm) and 0.5 inch (12.7 mm) in length.

Embodiments can include combinations of the above features.

Further details of these and other aspects of the subject matter of this application will be apparent from the detailed description included below and the drawings.

DESCRIPTION OF THE DRAWINGS

Reference is now made to the accompanying drawings, in which:

FIGS. 10A and 10B show a mold cavity being partially filled and completely filled respectively;

FIGS. 11A and 11B show a mold cavity being partially filled and completely filled respectively;

FIGS. 12A and 12B show a mold cavity being partially filled and completely filled respectively;

FIGS. 13A and 13B show a mold cavity being partially filled and completely filled respectively; FIGS. 14A and 14B show a mold cavity being partially filled and completely filled respectively.

DETAILED DESCRIPTION

The following disclosure relates to thrust reverser cascades made from (e.g., thermoplastic) composite materials and methods for manufacturing such cascades. It is understood that the methods disclosed herein can also be used to manufacture parts other than thrust reverser cascades. For example, the methods disclosed herein can be used to manufacture composite (e.g., aircraft or aircraft engine) parts that have one or more aerodynamic surfaces that are intended to interact with a flow of fluid (e.g., air). In various embodiments, the methods disclosed herein can use overmolding to form a portion of a part defining an aerodynamic surface such as one or more vanes of a thrust reverser cascade. In some embodiments, the methods disclosed herein can be of reduced complexity, less time-consuming and therefore less costly than some existing methods of manufacturing (e.g., thermoset) composite thrust reverser cascades. In some embodiments, the methods disclosed herein can also exhibit better process repeatability than other methods of producing composite thrust reverser cascades.

In some embodiments, the methods disclosed herein can comprise overmolding one or more components of a part onto one or more other (e.g., thermoformed) components of the part. Overmolding is a process whereby two or more materials are combined to create a single part. The first material (i.e., substrate) is partially or fully covered by one or more subsequent (i.e., overmold) materials during the manufacturing process. Overmolding is an injection molding process where one material is heated to a flowable state, injected under pressure into a mold into which it is molded onto a second material already disposed in the mold. Depending on the materials selected and geometry of the substrate and overmold, the overmold can form a relatively strong bond with the substrate. In other words, overmolding is a process of adding an additional layer of material over at least part of an already existing component.

In various embodiments of the methods disclosed herein, the substrate onto which the overmolding is conducted can be produced using any suitable methods. In some embodiments, the substrate can be made by thermoforming prior to the overmolding. Thermoforming is a manufacturing process where a (e.g., thermoplastic) sheet is heated to a pliable forming temperature, formed in a mold and optionally trimmed to the desired shape. The sheet is typically heated in an oven to a high enough temperature that permits it to be stretched in or onto a mold and then cooled in order to retain the desired shape.

Aspects of various embodiments are described through reference to the drawings.

Figure 1A:
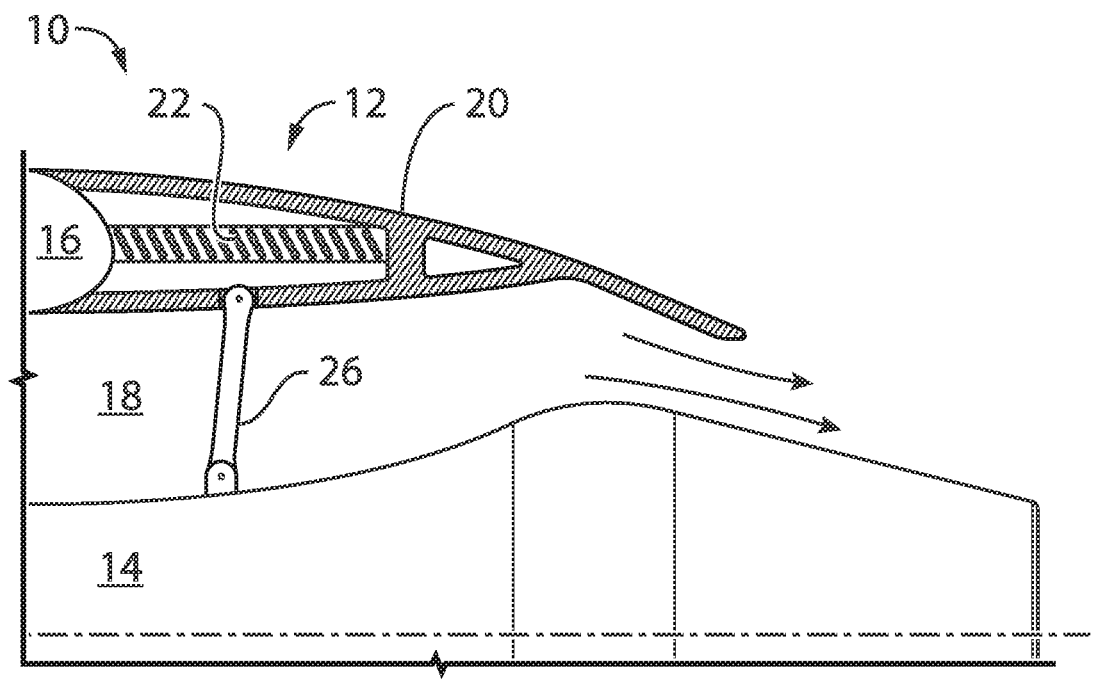
FIG. 1A is a schematic axial cross-sectional view of part of an aircraft engine showing an exemplary cascade-type thrust reverser in a stowed state.
Figure 1B:
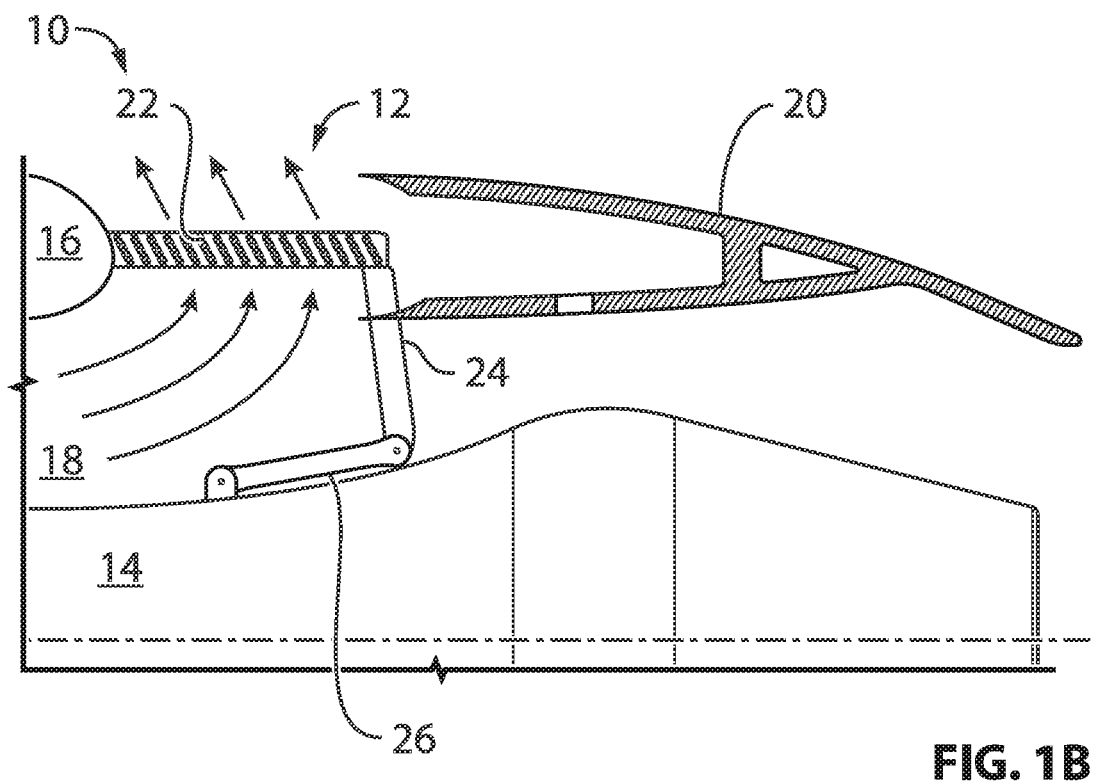
FIG. 1B is a schematic axial cross-sectional view of part of the aircraft engine of FIG. 1A showing the thrust reverser in a deployed state.

FIGS. 1A and 1B are schematic axial cross-sectional views of part of an exemplary aircraft engine 10 showing an exemplary cascade-type thrust reverser 12 in a stowed state and in a deployed state respectively. In some embodiments, engine 10 can be of a turbofan type for example. Engine 10 can include engine core 14, nacelle 16 that surrounds engine core 14, bypass duct 18 defined between nacelle 16 and engine core 14 and a fan (not shown) that propels a flow of ambient air through engine 10. The flow of air through engine 10 can be split into engine core airflow and bypass airflow through bypass duct 18. In some embodiments, the fan can produce a majority of the thrust produced by engine 10.

Thrust reverser 12 can be used to temporarily redirect some of the thrust produced by engine 10 forward instead of rearward. The reversed thrust acts against the forward motion of an aircraft to which engine 10 is mounted in order to provide deceleration. Thrust reverser 12 can assist with slowing down an aircraft just after touch-down during landing. Engine 10 can be mounted to a wing or a fuselage of a fixed-wing aircraft for example.

Thrust reverser 12 can be integrated into nacelle 16. Thrust reverser 12 can comprise translatable cowl 20 (referred hereinafter as "transcowl 20"), one or more cascade panels 22 (referred hereinafter as "cascade 22") and one or more blocker doors 24 (see FIG. 1B). Transcowl 20 can be movable between: (1) a stowed position (see FIG. 1A) where cascade 22 does not interact with the flow of bypass air flowing through bypass duct 18; and (2) a deployed position (see FIG. 1B) where cascade 22 interacts with the flow of bypass air. Transcowl 20 can be selectively translatable between the stowed and deployed positions via one or more suitable actuators (not shown) so as to expose cascade 22 to the flow of bypass air. Blocker door 24 can be caused to deploy with the deployment of transcowl 20. For example, blocker door 24 can be pivotally connected at a first end to part of nacelle 16 (e.g., transcowl 20) and pivotally connected at a second end to link 26, which in turn can be pivotally connected to a casing or other structural component of engine core 14. In its deployed position, blocker door 24 can cause at least some of the flow of bypass air in bypass duct 18 to exit bypass duct 18 via cascade 22 instead of via an aft nozzle of bypass duct 18. Cascade 22 can be configured to cause the diverted flow of bypass air to be redirected at least partially in the forward direction in order to produce some reverse thrust.

Figure 2A:
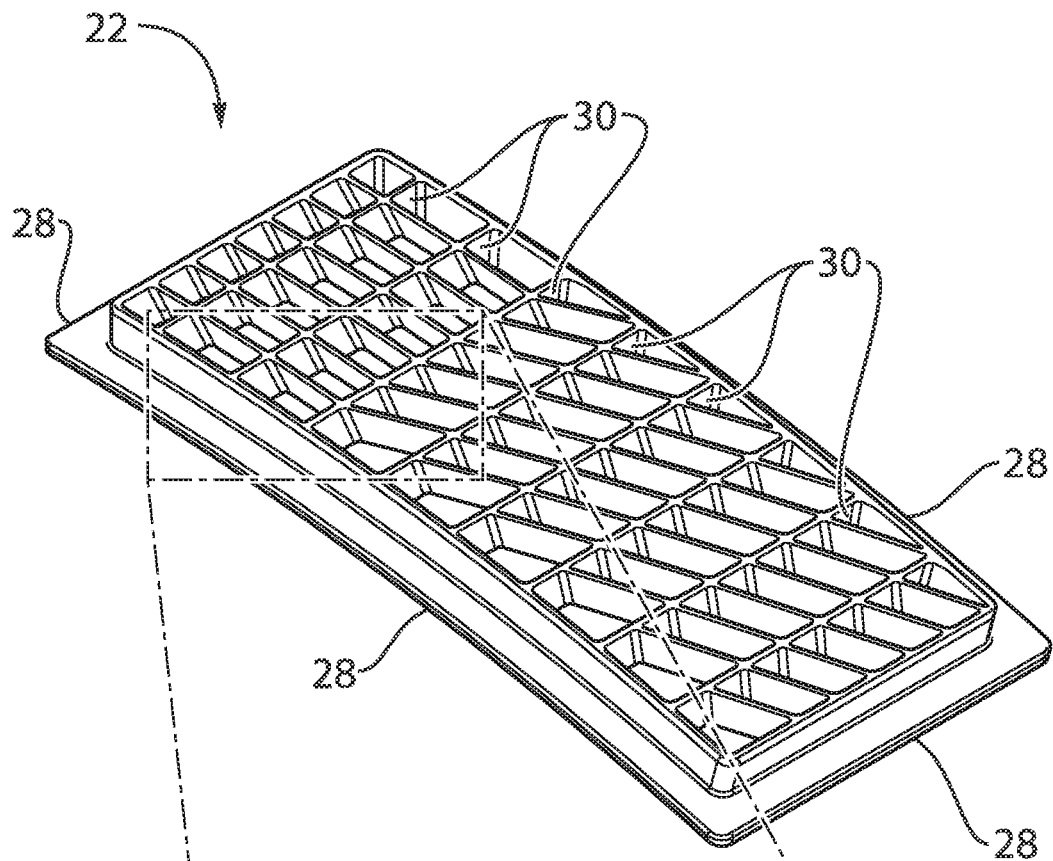
FIG. 2A is a perspective view of an exemplary cascade of the thrust reverser of FIGS. 1A and 1B.
Figure 2B:
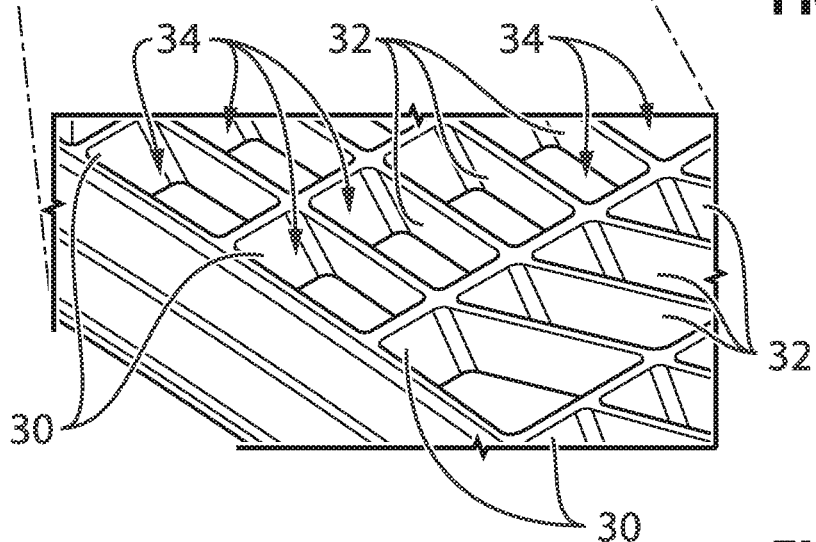
FIG. 2B is an enlarged perspective view of part of the cascade of FIG. 2A.

FIG. 2A is a perspective view of an exemplary cascade 22 of thrust reverser 12. FIG. 2B is an enlarged perspective view of cascade 22. Cascade 22 can be configured as a generally curved (e.g., arcuate) panel that is configured to interact with a flow of air exiting bypass duct 18 via a partially annular opening defined by the deployment of transcowl 20. Cascade 22 can extend partially circumferentially about a centerline of engine 10. In some embodiments, engine 10 can include a plurality of cascades 22. Cascade 22 can comprise a frame defined by one or more thermoformed outer frame members 28 cooperatively defining at least part of a periphery of cascade 22. The frame can also comprise one or more thermoformed or overmolded ribs 30 connected (e.g., bonded) to the one or more outer frame members 28. In some embodiments, a plurality of spaced-apart ribs 30 can extend between and be connected to opposite frame members 28. In some embodiments, some vanes 32 can extend between and be connected (e.g., bonded) to ribs 30. In some embodiments, one or more vanes 32 can be oriented substantially transversely to ribs 30. In some embodiments, one or more vanes 32 can be oriented obliquely to ribs 30. Vanes 32 can be spaced-apart to define openings 34 therebetween allowing some of the bypass airflow to exit bypass duct 18. Vanes 32 can each define one or more aerodynamic surfaces oriented and configured to interact with the redirected flow of bypass air and change the direction of the flow of bypass air passing through cascade 22 in order to produce reverse thrust. In some embodiments, cascade 22 can define a grid structure including a two-dimensional array of vanes 32 and associated openings 34. As explained below, outer frame members 28, ribs 30 and vanes 32 can be made from non-metallic fiber-reinforced composite materials. In some embodiments, outer frame members 28, ribs 30 and vanes 32 can each comprise reinforcement fibers embedded in a thermoplastic matrix.

Figure 3:
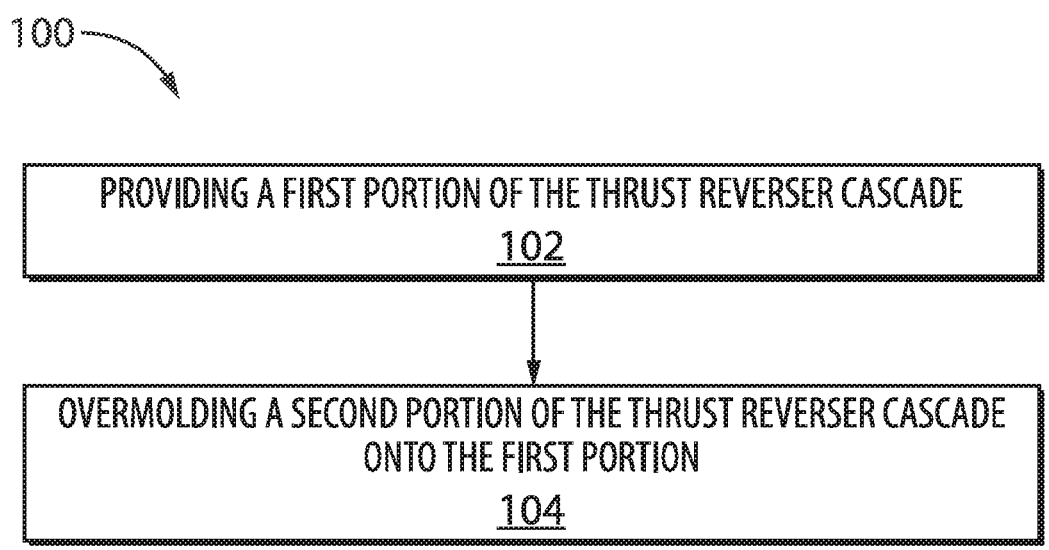
FIG. 3 is a flowchart of a method of manufacturing a thrust reverser cascade.

FIG. 3 is a flowchart of an exemplary method 100 of manufacturing thrust reverser cascade 22. In various embodiments, method 100 can include one or a combination of two or more composite manufacturing techniques. For example, in some embodiments, method 100 can include the use of overmolding for one portion of cascade 22 in combination with another process (e.g., thermoforming) for another portion of cascade 22. In various embodiments, method 100 can comprise:

providing a first portion (e.g., outer frame members 28) of cascade 22 (see block 102); and overmolding a second portion (e.g., including vanes 32) of cascade 22 onto the first portion (see block 104).

In some embodiments, the provided first portion can comprise one or more outer frame members 28 cooperatively defining at least part of the periphery of cascade 22. The second portion can include one or more vanes 32. The size and volume of first and second portions can vary in various embodiments disclosed herein. In some embodiments, the entire internal grid structure of cascade 22 can be formed by overmolding for example. Alternatively, only part of the internal grid structure of cascade 22 can be formed by overmolding. For example, ribs 30 can be provided as part of the first portion prior to overmolding or can be overmolded as part of the second portion (e.g., simultaneously) with vanes 32. Accordingly, in one scenario, a frame including outer frame members 28 and no ribs 30 can be provided where ribs 30 and vanes 32 are subsequently formed by overmolding to form cascade 22. In another scenario, a frame including outer frame members 28 and ribs 30 can be provided where vanes 32 are subsequently formed by overmolding to form cascade 22. In some embodiments, one or more ribs 30 could be provided as part of the frame before overmolding and one or more ribs 30 could be part of the one or more second components formed by overmolding.

Providing the first portion prior to overmolding can include thermoforming such first portion. For example, outer frame members 28 and optionally ribs 30 can be thermoformed from one or more suitable fiber-reinforced composite material(s) such as a fiber-reinforced polymer for example. In various embodiments, the reinforcement fibers can comprise glass and/or carbon. Accordingly, the material of outer frame members 28 and/or ribs 30 can be made from a glass-fiber-reinforced thermoplastic resin or from a carbon-fiber-reinforced thermoplastic resin for example. In some embodiments, the reinforcement fibers in the thermoformed components can be relatively long. In some embodiments, the reinforcement fibers in the thermoformed components can extend continuously along a dimension (e.g., length or width) of a thermoformed component. In some embodiments, at least a majority of the long reinforcement fibers of one or more thermoformed components can be generally unidirectional. In some embodiments, at least a majority of the long reinforcement fibers of one or more thermoformed components can be generally parallel. In some embodiments, at least a majority of the long reinforcement fibers of one or more thermoformed components can be woven. In some embodiments, the reinforcement fibers can be embedded in a (e.g., thermoplastic) polymer matrix material which can comprise polyaryletherketone (PAEK), polyether ether ketone (PEEK), polyetherketoneketone (PEKK), polyetherimide (PEI), polyamide (PA) or polyphenylene sulfide (PPS) for example. In some embodiments, the thermoformed components can be formed from a long (e.g., continuous) fiber thermoplastic laminate sheet. In some embodiments, the thermoformed components can be formed from a thermoplastic matrix composite pre-impregnated (i.e., "prepreg") material.

The overmolded components (e.g., vanes 32 and optionally ribs 30) can also comprise suitable fiber-reinforced composite material(s) such as a fiber-reinforced polymer for example. In various embodiments, the reinforcement fibers can comprise glass and/or carbon. Accordingly, the material of vanes 32 and/or ribs 30 can be a glass-fiber-reinforced thermoplastic resin or a carbon-fiber-reinforced thermoplastic resin for example. In some embodiments, the reinforcement fibers in the overmolded components can be relatively short (e.g., chopped fibers, 0.25 inch (6.4 mm) to 0.5 inch (12.7 mm) in length) to permit adequate flow of the overmolding material during injection molding. In some embodiments, a majority of the reinforcement fibers in the overmolded components can be variably (e.g., generally randomly) oriented. In some embodiments, the overmolding material can have a volume fraction of reinforcement fibers that is about 20%. In some embodiments, the overmolding material can have a volume fraction of reinforcement fibers that is greater than 20%. In some embodiments, the overmolding material can have a volume fraction of reinforcement fibers that is about 30%. In some embodiments, the overmolding material can have a volume fraction of reinforcement fibers that is about 40%. In some embodiments, the overmolding material can have a volume fraction of reinforcement fibers that is between 20% and 40%. In some embodiments, the reinforcement fibers can be embedded in a (e.g., thermoplastic) polymer matrix material which can comprise PAEK, PEEK, PEKK, PEI, PA or PPS for example. In some embodiments, the thermoformed portion can have longer reinforcement fibers than the overmolded portion.

Aspects of method 100 are described below in relation to FIGS. 4A-8B.

Figure 4A:
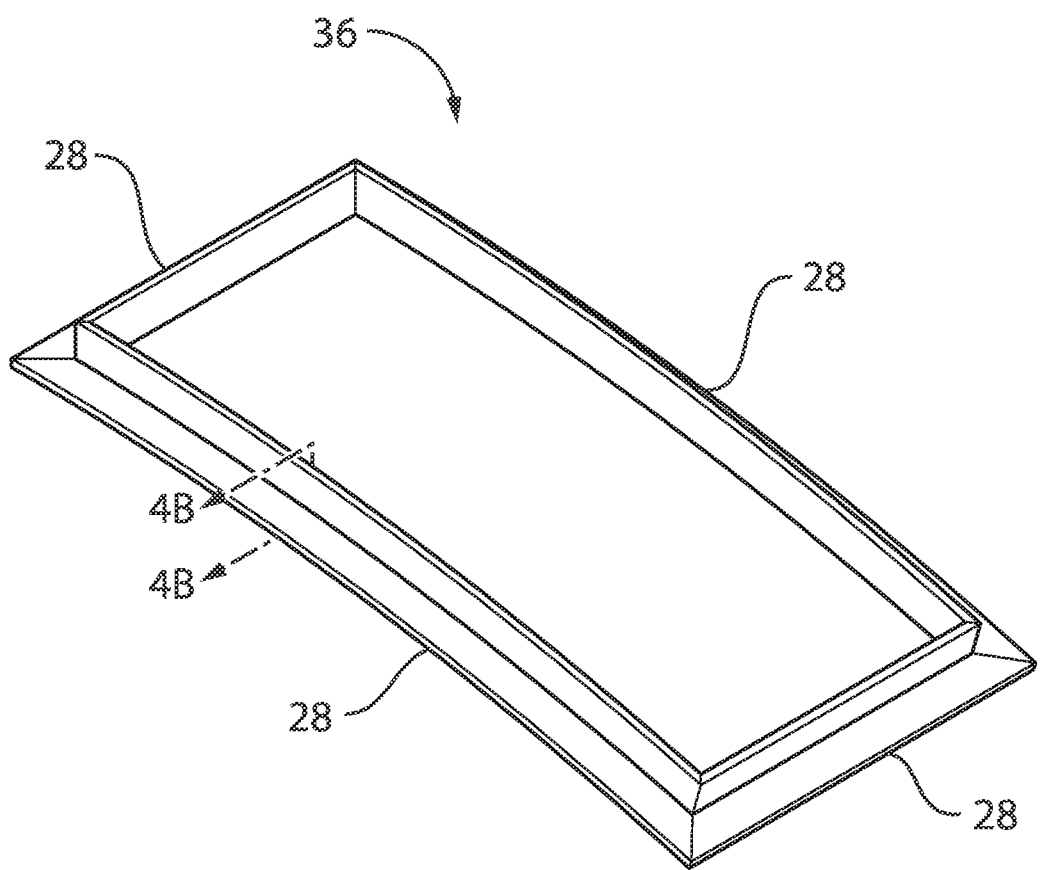
FIG. 4A is a schematic perspective view of an exemplary frame of the cascade of FIG. 2A.
Figure 4B:
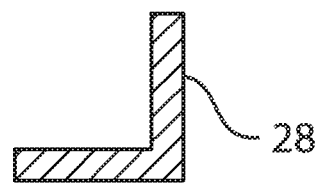
FIG. 4B is a cross-sectional profile of an outer frame member of the frame of FIG. 4A at line 4-4 of FIG. 4A.

FIG. 4A is a schematic perspective view of an exemplary frame 36 of cascade 22. FIG. 4B is an exemplary L-shaped cross-sectional profile of an outer frame member 28 of frame 36 at line 4-4. Frame 36 can comprise an assembly of a plurality of outer frame members 28 which define at least partially a periphery of cascade 22. Outer frame members 28 can be separately thermoformed and subsequently assembled together to form frame 36, which can then serve as a substrate for subsequent overmolding of ribs 30 and vanes 32 in one step. In some embodiments, frame 36 can have a four-sided shape formed by four outer frame members 28 assembled together. In some embodiments, outer frame members 28 can be bonded together using resistance welding, inductance welding, ultrasonic welding and/or adhesion for example.

Figures 5A, 5B:
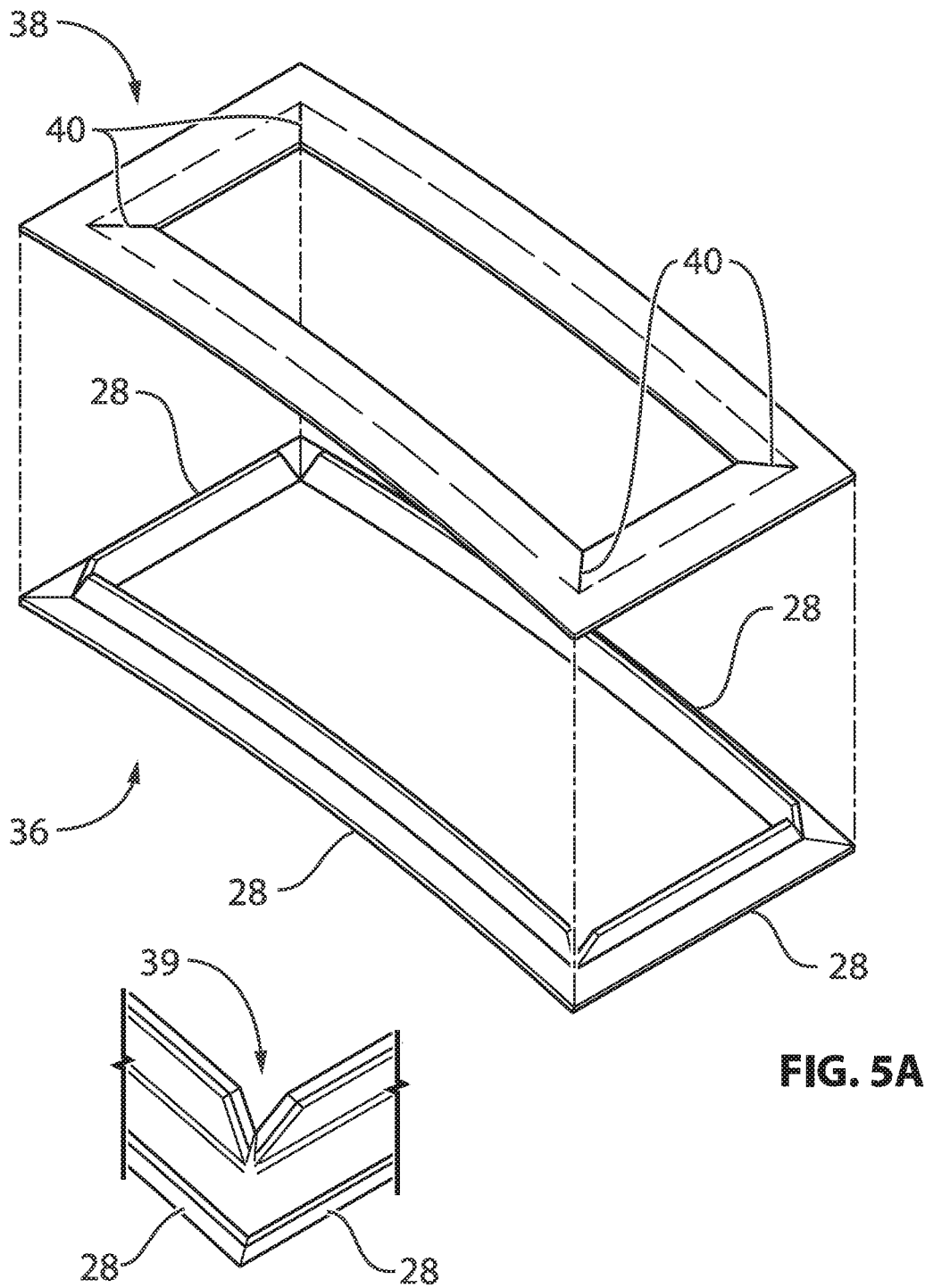
FIG. 5A is a schematic perspective view of another exemplary frame of the cascade of FIG. 2A.
FIG. 5B is an enlarged perspective view of a corner region of the frame of FIG. 5A.

FIG. 5A is a schematic perspective view of another exemplary frame 36 of cascade 22. FIG. 5B is an enlarged perspective view of a corner region of frame 36 of FIG. 5B. In some embodiments, frame 36 can be thermoformed as a single-piece (e.g., four-sided) component defining the periphery of cascade 22. For example, frame 36 can be thermoformed from sheet 38 comprising substantially continuous reinforcement fibers extending generally along one axis thereof. Sheet 38 can comprise a central opening defined between four sides intended to be thermoformed into respective outer frame members 28. Sheet 38 can comprise slits 40 pre-cut therein to facilitate forming of the L-shaped cross-sectional profile of outer frame members 28 and the corners of frame 36 where adjacent outer frame members 28 intersect. The single-piece thermoformed frame 36 may not require subsequent bonding of adjacent outer frame members 28 after thermoforming. The single-piece thermoformed frame 36 can serve as a substrate for subsequent overmolding of ribs 30 and vanes 32 in one step.

In some embodiments, additional material could be added to corners of frame 36 in order to close gaps 39 (see FIG. 5B) defined between adjacent walls of frame 36 if desired. Such additional material could comprise separate corner pieces of the same type of thermoformed composite material as outer frame members 28 and that are subsequently bonded (e.g., welded) to the corner regions of frame 36 to close gaps 39 and thereby reinforce the corner regions for example. Alternatively, the gaps 39 formed in frame 36 could be permitted to be filled with overmolding material during overmolding.

Figure 6A:
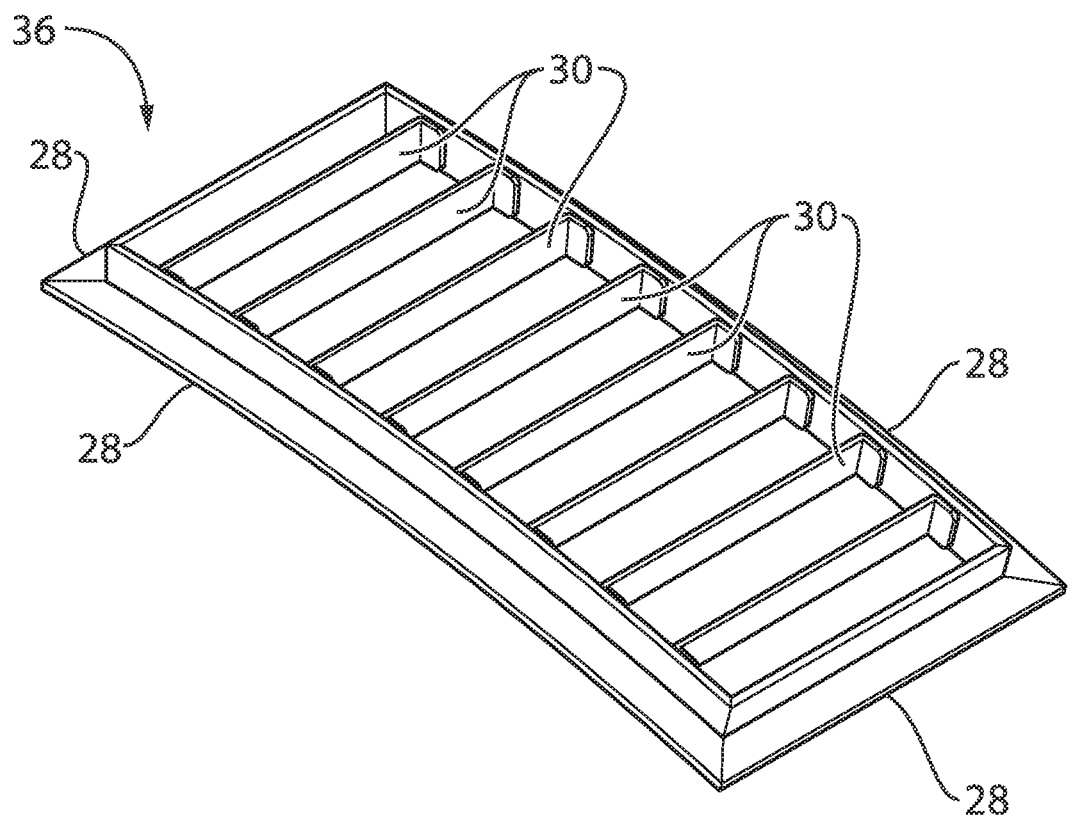
FIG. 6A is a perspective view of another exemplary frame of the cascade of FIG. 2A.

FIG. 6A is a perspective view of another exemplary frame 36 of cascade 22. As explained above, one or more ribs 30 can, in some embodiments, be part of frame 36 which serves as the substrate for subsequent overmolding of vanes 32. FIG. 6A illustrates an embodiment of frame 36 which includes ribs 30. In various embodiments, outer frame members 28 can be individually thermoformed and subsequently bonded together. Alternatively, outer frame members 28 can be thermoformed as a single-piece component as shown in FIG. 5A. Ribs 30 can be produced by thermoforming and subsequently assembled with (e.g., bonded to) outer frame members 28. Ribs 30 can extend between and be assembled with two opposite outer frame members 28.

Figure 6B:
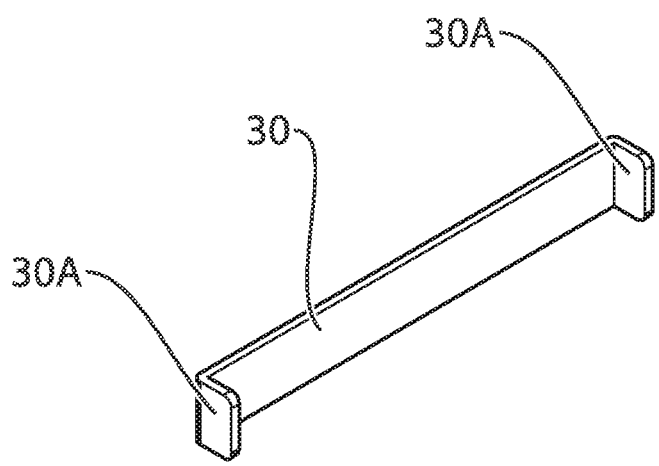
FIG. 6B is a perspective view of an exemplary rib of the frame of FIG. 6A.

FIG. 6B is a perspective view of an exemplary thermoformed rib 30 of frame 36 of FIG. 6A. Ribs 30 can be assembled with outer frame members 28 by bonding (e.g., welding and/or adhesion) for example via tabs 30A that are integral to ribs 30. For example, tabs 30A of rib 30 shown in FIG. 6B can be bonded to corresponding inner surfaces of outer frame members 28. In some embodiments, ribs 30 can be thermoformed from the same type of composite material as outer frame members 28.

Figure 7:
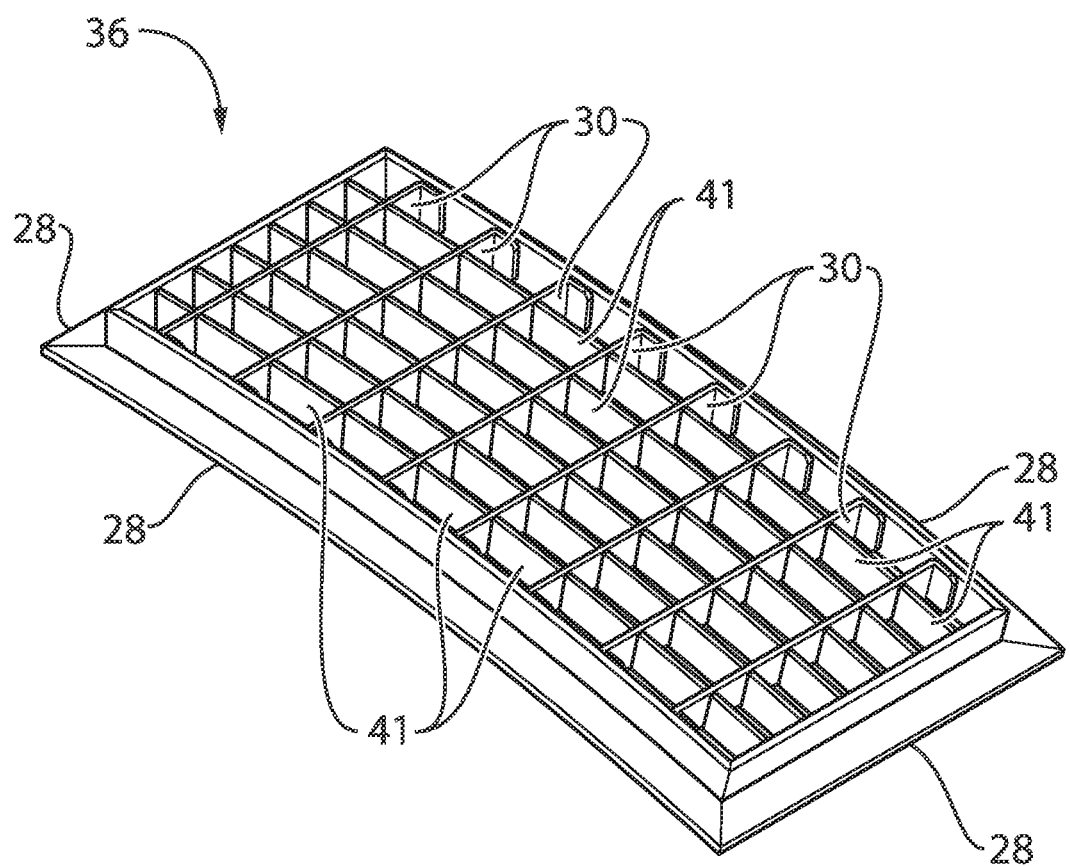
FIG. 7 is a perspective view of another exemplary frame of the cascade of FIG. 2A.

FIG. 7 is a perspective view of another exemplary frame 36 of cascade 22. In some embodiments, one or more ribs 30 and one or more braces 41 can be part of frame 36 which serves as the substrate for subsequent overmolding. Frame 36 of FIG. 7 illustrates an embodiment of frame 36 which includes outer frame members 28, ribs 30 and braces 41. In various embodiments, outer frame members 28 can be individually thermoformed and subsequently bonded together, or alternatively, outer frame members 28 can be thermoformed as a single-piece component as shown in FIG. 5A. Ribs 30 can be produced by thermoforming and subsequently assembled with (e.g., bonded to) outer frame members 28. Braces 41 can be produced by thermoforming and subsequently assembled with (e.g., bonded to and/or interlocked with) ribs 30. In some embodiments, braces 41 can be thermoformed from the same type of composite material as outer frame members 28 and ribs 30.

Thermoformed braces 41 can extend between adjacent ribs 30 and be disposed at locations of eventual overmolded vanes 32. For example, vanes 32 can be overmolded directly onto respective braces 41 so that each brace 41 can serve as structural reinforcement for a corresponding overmolded vane 32. In some embodiments, each brace 41 can become an inner core of the corresponding overmolded vane 32. The reinforcement fibers of braces 41 can be longer than the reinforcement fibers of in the overmolding material from which vanes 32 are formed. The use of overmolding for vanes 32 can promote dimensional control and hence accuracy over the forming of tightly controlled aerodynamic surfaces defined by vanes 32. Braces 41 can provide a suitable substrate over which the aerodynamic surfaces of vanes 32 can be overmolded and can therefore become a structural part of vanes 32.

Figure 8A:
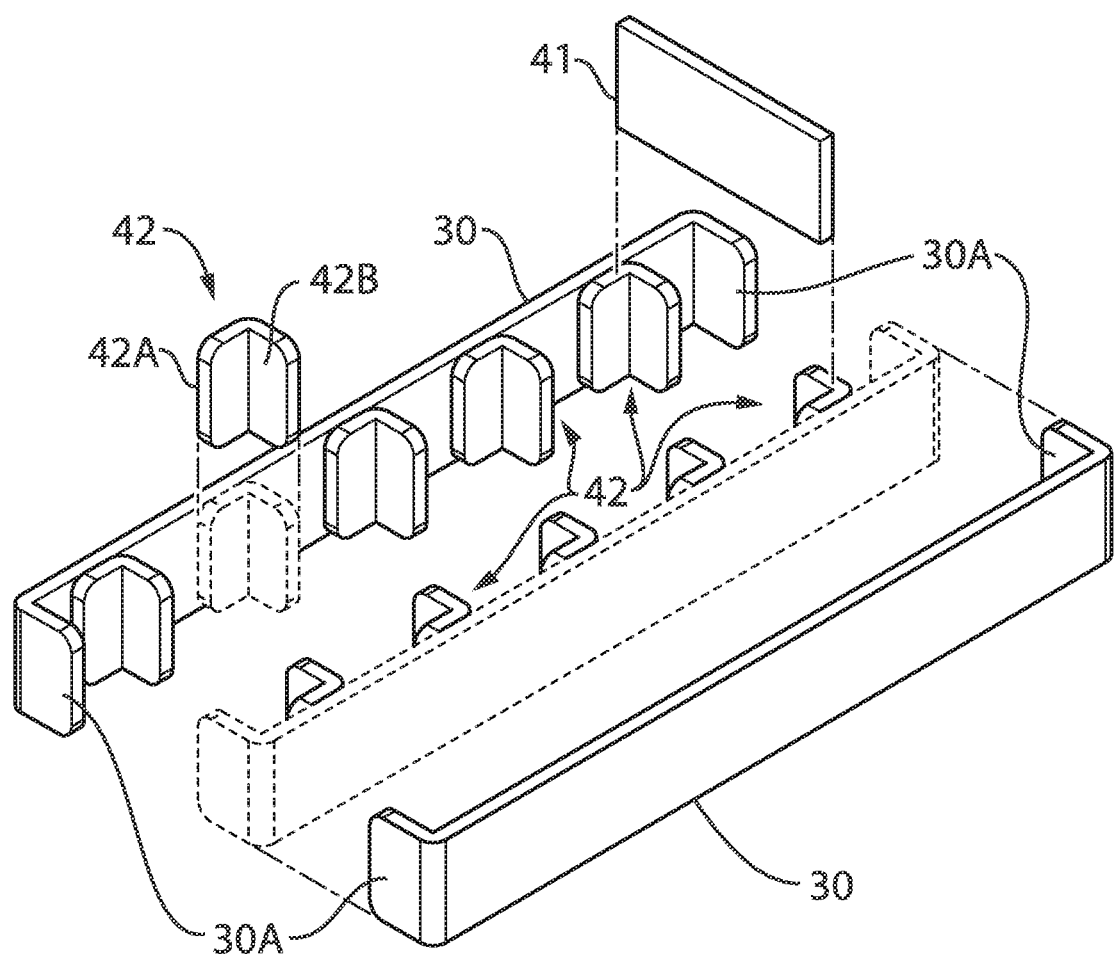
FIG. 8A is a schematic perspective view of an exemplary method of assembling braces with ribs of the frame of FIG. 7.

FIG. 8A is a schematic perspective view of an exemplary method of assembling braces 41 with ribs 30 of frame 36 of FIG. 7. Braces 41 can be individually thermoformed and subsequently assembled with outer frame members 28 by bonding (e.g., welding and/or adhesion) for example. Some braces 41 can be bonded to ribs 30 via brackets 42 providing tabs 42A and 42B. In some embodiments, brackets 42 can be thermoformed from the same type of composite material as outer frame members 28. For example, tab 42A of bracket 42 can be bonded to a side surface of rib 30 and tab 42B of bracket 42 can be bonded to an end surface of brace 41. Accordingly, frame 36 including outer frame members 28, ribs 30, braces 41 and brackets 42 can serve as a substrate for subsequent overmolding of vanes 32 and/or other surfaces in one step.

Figure 8B:
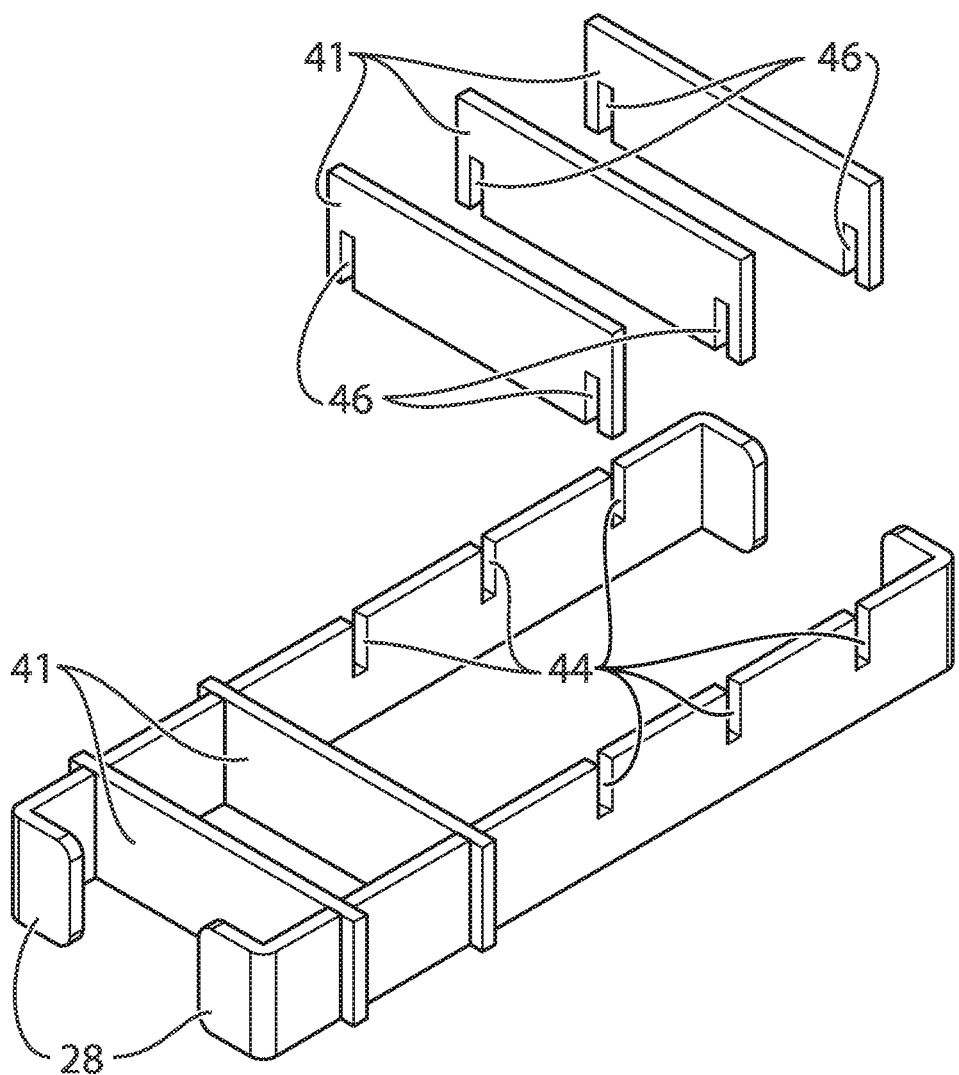
FIG. 8B is a schematic perspective view of another exemplary method of assembling braces with ribs of the frame of FIG. 7.

FIG. 8B is a schematic perspective view of another exemplary method of assembling braces 41 with ribs 30 of frame 36 of FIG. 6A. Some braces 41 can be individually thermoformed and subsequently assembled with ribs 30 via cutouts 44, 46. For example braces 41 can be mechanically interlocked with ribs 30 via cutouts 44 formed in ribs 30 and counterpart cutouts 46 formed in braces 41. In this embodiments, braces 41 can have a length that spans across more than two ribs 30 and can comprise appropriately spaced cutouts 46 for interlocking with more than two ribs 30. In some embodiments, one or more braces 41 can be shaped to generally follow the curvature of cascade 22. In some embodiments, one or more braces 41 can be interlocked with all of ribs 30 of cascade 22. The interlocking of components of frame 36 can serve to support such components inside a mold used for overmolding vanes 32 and/or other surfaces.

Figure 9:
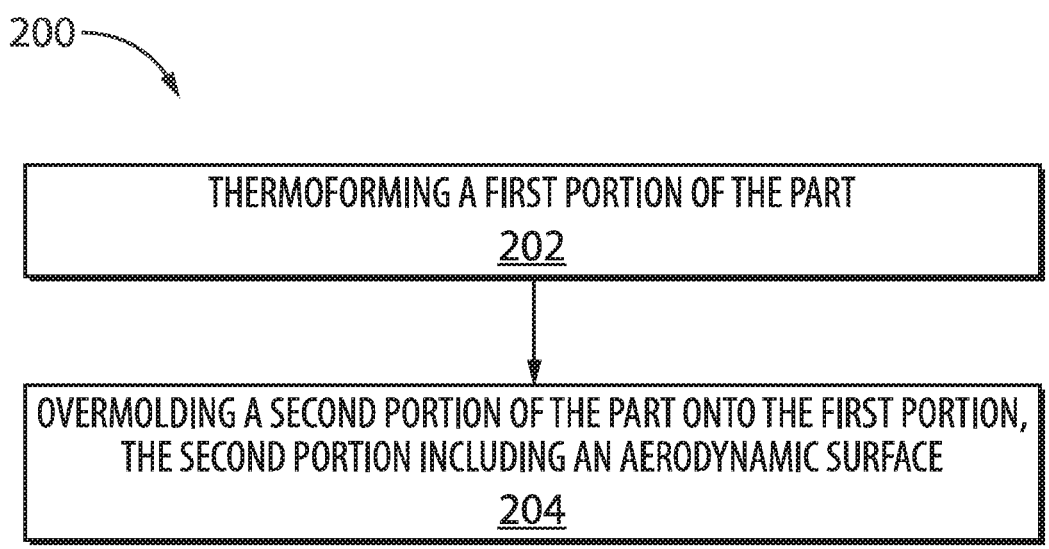
FIG. 9 is a flowchart of another method of manufacturing a part for interacting with a flow of fluid.

FIG. 9 is a flowchart of another method 200 of manufacturing a part comprising an aerodynamic surface for interacting with a flow of fluid. The part can be an aircraft part or a part of aircraft engine 10 configured to interact with a flow of air for example. In some embodiments, the aerodynamic surface formed by overmolding can be configured to redirect the flow of fluid and can be aerodynamically formed to provide a desired effect on the flow of fluid. In various embodiments, the aerodynamic surface can be planar or curved (e.g., concave and/or convex). Aspects of method 100 can also apply to method 200 and vice versa. For example, method 200 can also be used to manufacture cascade 22 where one or more vanes 32 define one or more respective aerodynamic surfaces. Method 200 is described in relation with FIGS. 10A-14B. In various embodiments, method 200 can include thermoforming a first portion A (see FIG. 10A) of the part (see block 202); and then overmolding a second portion B (see FIG. 10A) of the part onto the first portion B where the second portion B includes the aerodynamic surface (see block 204). The use of overmolding can promote dimensional accuracy over the geometry of the aerodynamic surface. The aerodynamic surface can be overmolded directly onto a component of first portion A such as brace 41 or indirectly such as by being connected to outer frame members 28 via overmolded ribs 30 for example.

First portion A and second portion B can each comprise reinforcement fibers in a thermoplastic matrix. The reinforcement fibers of second portion B can be shorter (e.g., 30% volume fraction of chopped fibers) to permit the overmolding material to flow and be injected into mold 48 (see FIG. 10A). The reinforcement fibers of first portion A can be longer (e.g., continuous) as provided in the thermoforming sheet 38 (see FIG. 5A). In situations where a plurality of components of first portion A are individually thermoformed, such components can be assembled (e.g., bonded and/or mechanically interlocked) together before overmolding the second portion B.

Figure 10A:
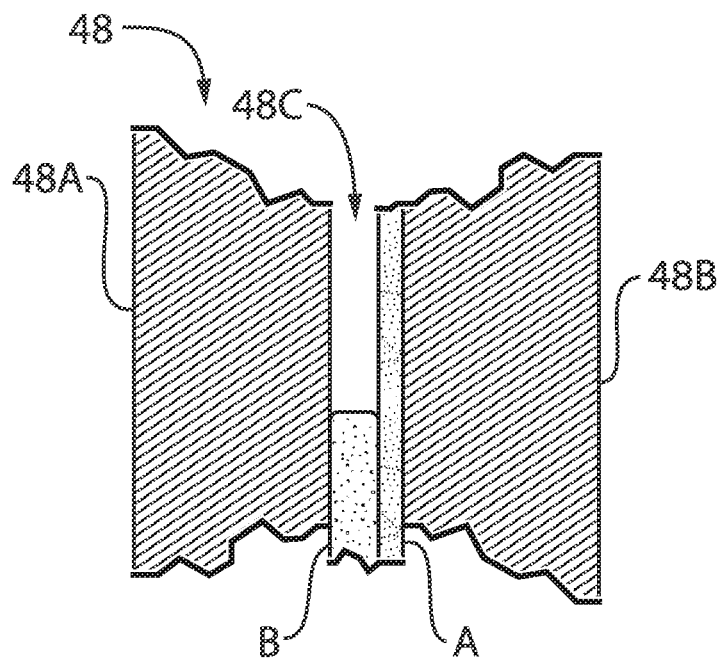
FIGS. 10A and 10B schematically illustrate an exemplary overmolding method where
Figure 10B:
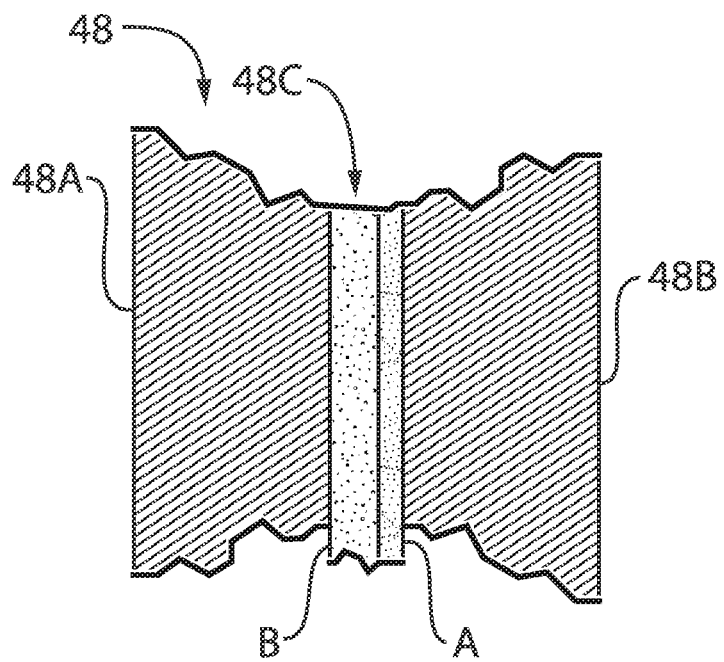

FIGS. 10A and 10B schematically illustrate an exemplary overmolding method. FIG. 10A shows part of mold 48 comprising two counterpart mold halves 48A, 48B defining mold cavity 48C therebetween. First (e.g., thermoformed) portion A serves as a substrate and is inserted in mold cavity 48C prior to the injection of the flowable overmolding material of second portion B. First portion A can be positioned to one side of mold cavity 48C and supported by mold half 48B during overmolding for example. The free space around (e.g., to one side of) first portion A inside mold cavity 48C can be filled by the heated flowable overmolding material and envelop one or more surfaces of first portion A that are exposed to the overmolding material.

In some embodiments, one or more properties of the substrate material (first portion A) can be different from those of the overmolding material (second portion B) so that first portion A is substantially unaffected by the exposure to heat and pressure during the injection of the material of second portion B. For example, suitable materials can be selected so that a thermoplastic resin for first portion A has a glass transition temperature Tg and a melting temperature Tm that are respectively higher than a corresponding glass transition temperature Tg and melting temperature Tm of a thermoplastic resin for second portion B. In some embodiments, materials of portions A and B can be selected to be chemically compatible and preferably from the same chemical family to promote adhesion/joining between the materials of portions A and B. However, it is understood that the materials of portions A and B may not necessarily be chemically compatible and that joining of portions A and B can also be achieved by mechanical interlocking after the overmolding material has solidified. FIG. 10A shows mold cavity 48C being partially filled with overmolding material and FIG. 10B shows mold cavity 48C being completely filled with overmolding material forming second portion B overmolded onto first portion A.

Figure 11A:
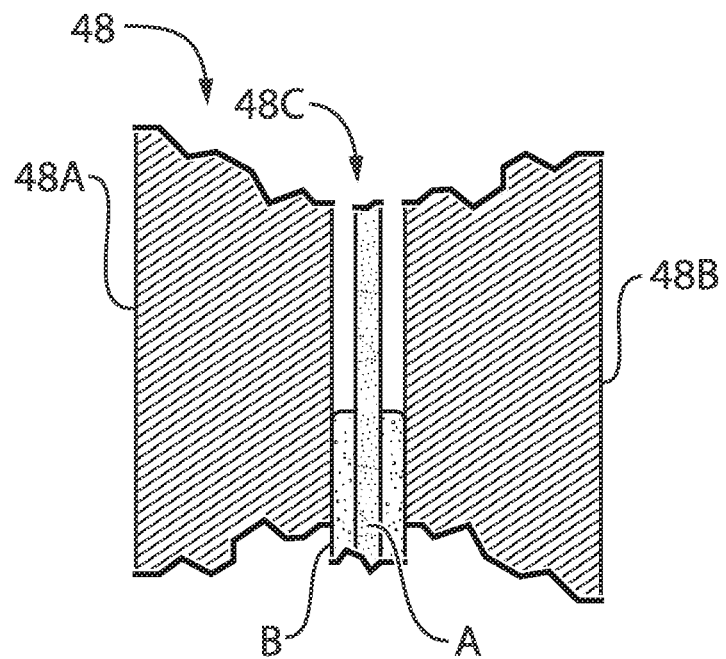
FIGS. 11A and 11B schematically illustrate another exemplary overmolding method where
Figure 11B:
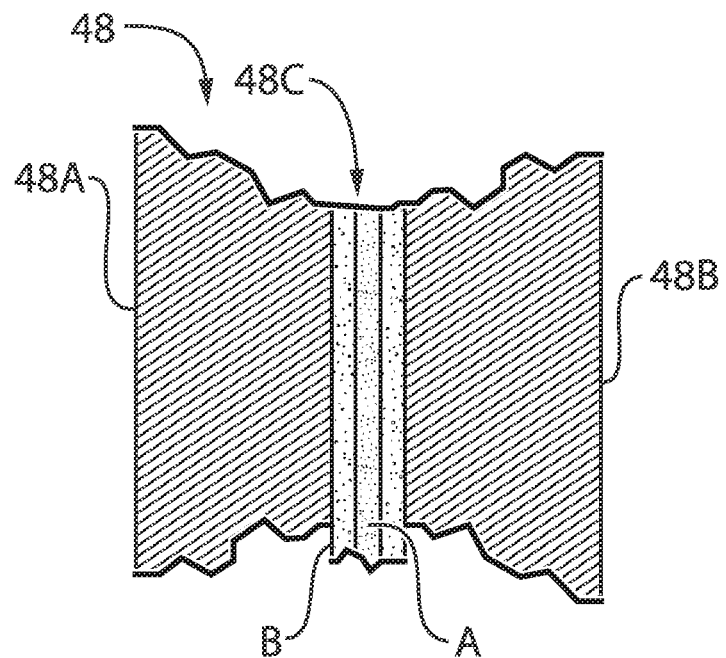

FIGS. 11A and 11B schematically illustrate another exemplary overmolding method using mold 48. Instead of being disposed to one side of mold cavity 48C, first portion A is shown as being disposed centrally inside mold cavity 48C so that flowable overmolding material can flow on and optionally bond with two or more sides of first portion A. FIG. 11A shows mold cavity 48C being partially filled with overmolding material and FIG. 11B shows mold cavity 48C being completely filled with overmolding material forming second portion B overmolded onto first portion A.

Figure 12A:
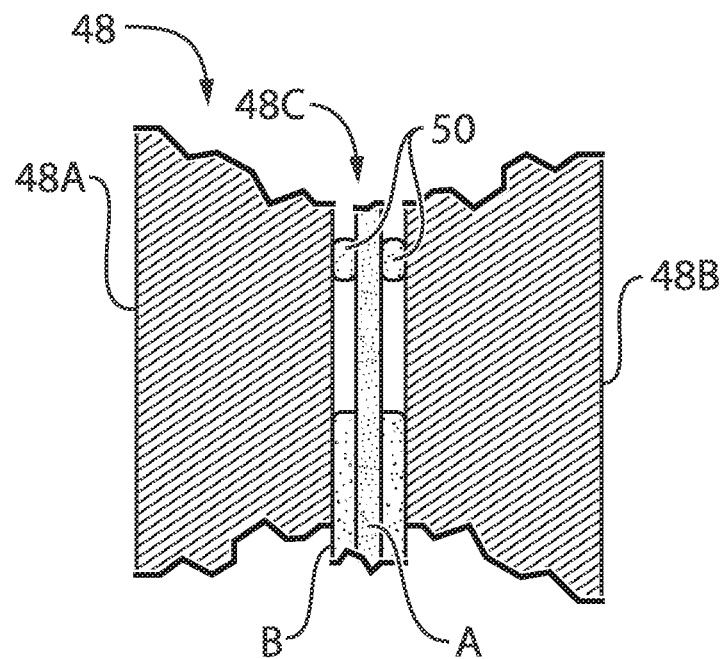
FIGS. 12A and 12B schematically illustrate another exemplary overmolding method where
Figure 12B:
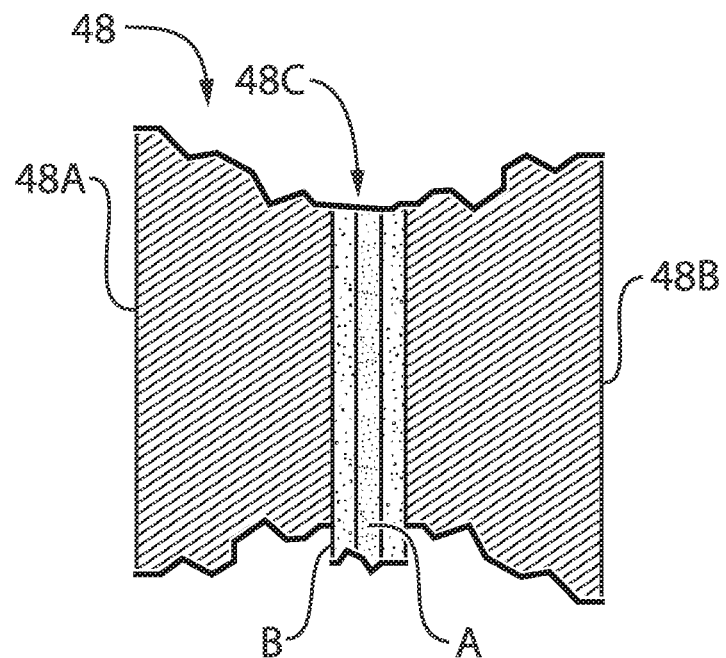

FIGS. 12A and 12B schematically illustrate another exemplary overmolding method using mold 48. First portion A is shown as being disposed centrally inside mold cavity 48C and supported via one or more spacers 50 that are made from the same type of overmolding material to be injected into mold cavity 48C. First portion A can be installed inside of mold cavity 48C with spacers 50 prior to overmolding. Spacers 50 can serve to support first portion A at the desired location within mold cavity 48C during overmolding. FIG. 12A shows mold cavity 48C being partially filled with overmolding material and FIG. 12B shows mold cavity 48C being completely filled with overmolding material forming second portion B overmolded onto first portion A.

Figure 13A:
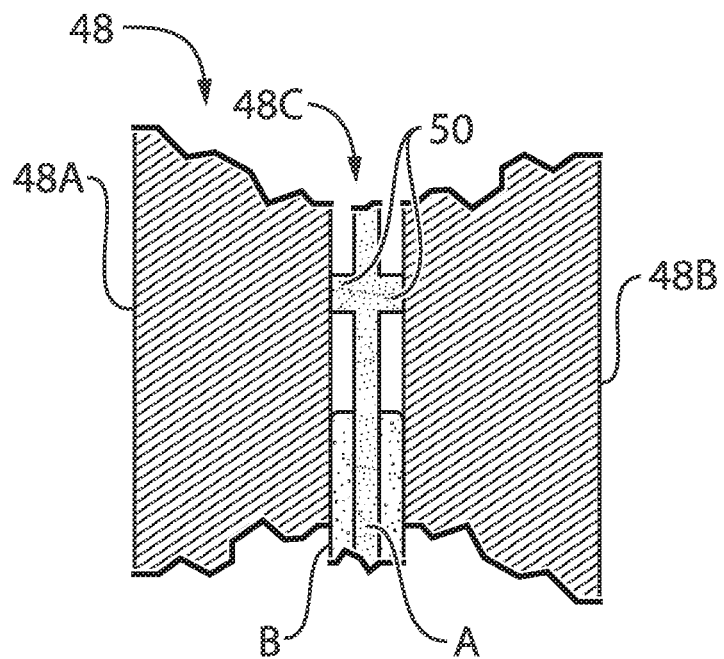
FIGS. 13A and 13B schematically illustrate another exemplary overmolding method where
Figure 13B:
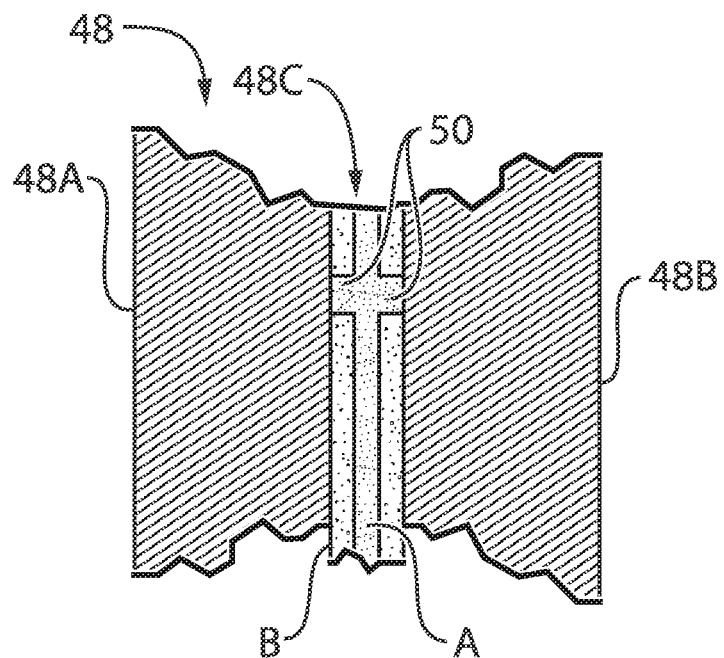

FIGS. 13A and 13B schematically illustrate another exemplary overmolding method using mold 48. First portion A is shown as being disposed centrally inside mold cavity 48C and supported via one or more spacers 50 that are made from the same type of thermoformed material as first portion A. In this embodiments, spacers 50 can be integrally formed with first portion A by thermoforming. Spacers 50 can serve to support first portion A at the desired location within mold cavity 48C during overmolding and mechanically interlock first portion A and second portion B together. FIG. 13A shows mold cavity 48C being partially filled with overmolding material and FIG. 13B shows mold cavity 48C being completely filled with overmolding material forming second portion B overmolded onto first portion A.

Figure 14A:
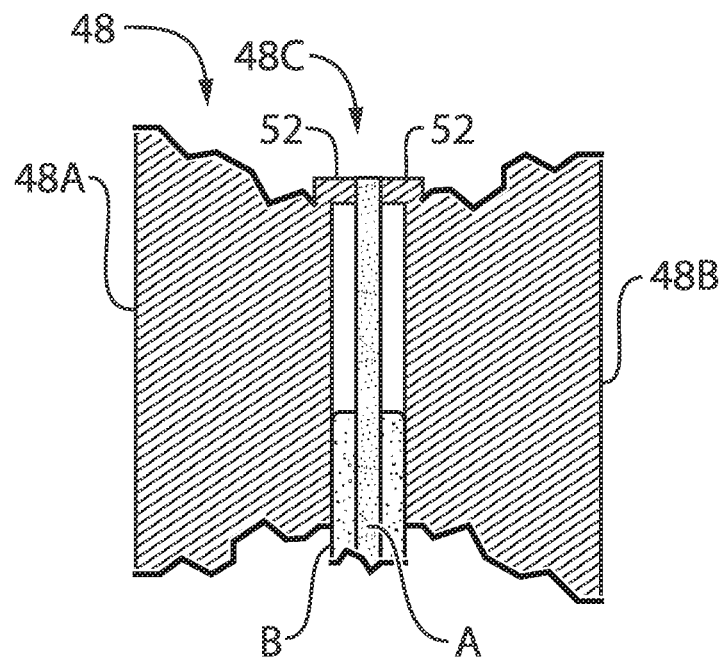
FIGS. 14A and 14B schematically illustrate another exemplary overmolding method where
Figure 14B:
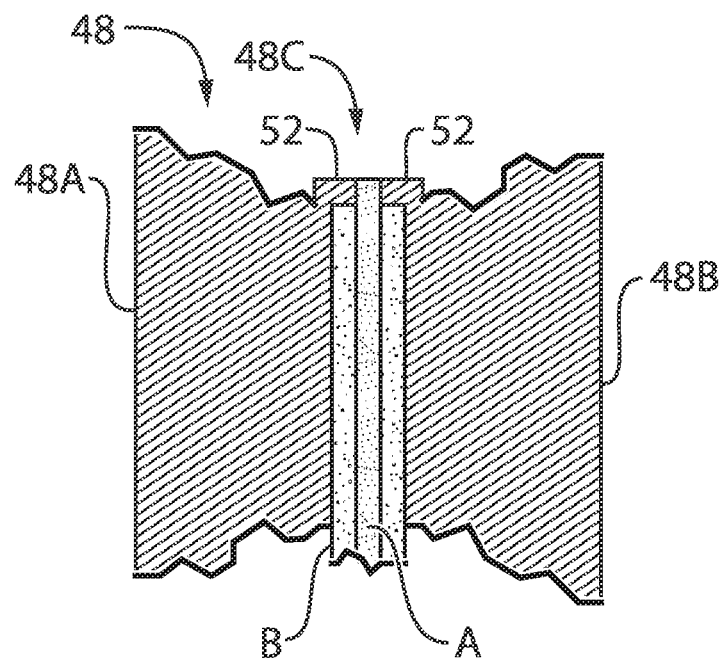

FIGS. 14A and 14B schematically illustrate another exemplary overmolding method using mold 48. First portion A is shown as being disposed centrally inside mold cavity 48C and supported via one or more tooling supports 52 that are part of mold halves 48A, 48B. In this embodiments, the portion of first portion A intended to be clamped by tooling supports 52 can be sacrificial and trimmed off after the overmolding process. Tooling supports 52 can serve to support first portion A at the desired location within mold cavity 48C during overmolding. FIG. 14A shows mold cavity 48C being partially filled with overmolding material and FIG. 14B shows mold cavity 48C being completely filled with overmolding material forming second portion B overmolded onto first portion A.

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. The present disclosure is intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

The invention claimed is:

1. A method of manufacturing a thrust reverser cascade of an aircraft engine using overmolding, the method comprising:
    mechanically interlocking a plurality of ribs and a plurality of braces via cutouts in the plurality of ribs and counterpart cutouts in the plurality of braces to form a first portion of the thrust reverser cascade;
    the plurality of ribs and the plurality of braces being made from a non-metallic fiber-reinforced composite material; and
    overmolding a second portion of the thrust reverser cascade onto the first portion, the second portion including a plurality of aerodynamic vanes of the thrust reverser cascade.

2. The method as defined in claim 1, each of the plurality of braces having a length spanning across more than two of the plurality of ribs, the mechanically interlocking step including mechanically interlocking each of the plurality of braces with the more than two of the plurality of ribs.

3. The method as defined in claim 1, the mechanically interlocking step including mechanically interlocking some of the plurality of braces with all of the plurality of ribs.

4. The method as defined in claim 1, further comprising a step of thermoforming the plurality of ribs and the plurality of braces.

5. The method as defined in claim 1, wherein the first portion includes one or more outer frame members cooperatively defining at least part of a periphery of the thrust reverser cascade.

6. The method as defined in claim 1, wherein the first portion and the second portion each comprise reinforcement fibers in a thermoplastic matrix.

7. The method as defined in claim 6, wherein the reinforcement fibers of the first portion are longer than the reinforcement fibers of the second portion.

8. The method as defined in claim 6, wherein a majority of the reinforcement fibers of the first portion are generally unidirectional.

9. The method as defined in claim 6, wherein a majority of the reinforcement fibers of the first portion are woven.

10. The method as defined in claim 6, wherein a majority of the reinforcement fibers in the second portion are variably oriented.

11. The method as defined in claim 6, wherein the reinforcement fibers in the second portion are between 0.25 inch (6.4 mm) and 0.5 inch (12.7 mm) in length.

12. A thrust reverser cascade of an aircraft engine, the thrust reverser cascade comprising:
    a first portion made from a non-metallic fiber-reinforced composite material, the first portion comprising:
        a plurality of ribs including a plurality of cutouts; and
        a plurality of braces including a plurality of counterpart cutouts, the plurality of ribs and the plurality of braces being mechanically interlocked via the plurality of cutouts and the plurality of counterpart cutouts; and
    a second portion overmolded onto the first portion, the second portion comprising a plurality of aerodynamic vanes.

13. The thrust reverser cascade as defined in claim 12, each of the plurality of braces having a length spanning across more than two of the plurality of ribs, each of the plurality of braces being mechanically interlocked with the more than two of the plurality of ribs.

14. The thrust reverser cascade as defined in claim 12, wherein the first portion further comprises one or more thermoformed outer frame members cooperatively defining at least part of a periphery of the thrust reverser cascade.

15. The thrust reverser cascade as defined in claim 12, wherein the plurality of braces define structural reinforcements of the plurality of vanes.

16. The thrust reverser cascade as defined in claim 12, wherein the first portion and the second portion each comprise reinforcement fibers in a thermoplastic matrix.

17. The thrust reverser cascade as defined in claim 16, wherein the reinforcement fibers of the first portion are longer than the reinforcement fibers of the second portion.

18. The thrust reverser cascade as defined in claim 16, wherein a majority of the reinforcement fibers of the first portion are generally unidirectional.

19. The thrust reverser cascade as defined in claim 16, wherein a majority of the reinforcement fibers of the first portion are woven.

20. The thrust reverser cascade as defined in claim 16, wherein a majority of the reinforcement fibers in the second portion are variably oriented.

* * * * *